United States Patent
Noest et al.

(10) Patent No.: US 7,227,079 B2
(45) Date of Patent: Jun. 5, 2007

(54) WEATHERPROOF COVER AND DISCONNECT SWITCH

(75) Inventors: Marc Noest, Westbury, NY (US); Cosmo Castaldo, Westbury, NY (US); Patricia Roccaro, West Islip, NY (US)

(73) Assignee: Leviton Manufacturing Co., Ltd., Little Neck, NY (US)

( * ) Notice: Subject to any disclaimer, the term of this patent is extended or adjusted under 35 U.S.C. 154(b) by 0 days.

(21) Appl. No.: 11/252,605

(22) Filed: Oct. 19, 2005

(65) Prior Publication Data

US 2006/0096775 A1    May 11, 2006

Related U.S. Application Data

(60) Provisional application No. 60/623,733, filed on Oct. 29, 2004.

(51) Int. Cl.
*H02G 3/08* (2006.01)

(52) U.S. Cl. .................. 174/50; 174/520; 174/53; 200/43.01; 200/297; 361/600

(58) Field of Classification Search .................. 174/50, 174/48, 52.1, 53, 58, 57, 66, 67, 481; 220/3.3, 220/3.7, 3.8, 241, 242, 3.2; 361/600, 601; 439/535, 536; 277/920, 921, 906, 910; 200/42.01, 200/43.01, 297, 302.1, 333, 302.2, 50.31, 200/50.29

See application file for complete search history.

(56) References Cited

U.S. PATENT DOCUMENTS

| | | | | |
|---|---|---|---|---|
| 3,098,114 A * | 7/1963 | Hawn et al. | .................. | 174/58 |
| 4,343,411 A * | 8/1982 | Chesnut et al. | ............. | 220/242 |
| 4,484,021 A * | 11/1984 | Schaefer et al. | .............. | 174/53 |
| 4,505,403 A * | 3/1985 | Bowden, Jr. et al. | ....... | 220/242 |
| 4,553,000 A * | 11/1985 | Appleton | ................. | 200/50.29 |
| 4,803,307 A * | 2/1989 | Shotey | ........................ | 174/67 |
| 5,298,701 A * | 3/1994 | Sandor | .................... | 200/50.31 |
| 5,485,356 A * | 1/1996 | Nguyen | ....................... | 174/66 |
| 5,527,993 A * | 6/1996 | Shotey et al. | ................. | 174/67 |
| 5,680,926 A * | 10/1997 | Sandor et al. | ........... | 200/50.11 |
| 6,674,031 B1 * | 1/2004 | Flegel | ......................... | 174/53 |
| 6,753,471 B2 * | 6/2004 | Johnson et al. | ............... | 174/50 |
| 6,822,161 B2 * | 11/2004 | Komatsu et al. | ............ | 277/920 |
| 2006/0037773 A1 * | 2/2006 | Castaldo et al. | | |

* cited by examiner

*Primary Examiner*—Angel R. Estrada
(74) *Attorney, Agent, or Firm*—Paul J. Sutton

(57) ABSTRACT

A weatherproof cover for protecting electrical receptacles from the harsh elements of weather is disclosed herein. This novel weatherproof cover is operable while the electrical receptacle is in use and includes a weatherproof switch that controls power to the receptacle such that when the receptacle cover of the weatherproof cover is closed after the insertion of an electrical appliance plug, the weatherproof switch can be selected to the ON position to provide power to the receptacle. Power can be subsequently removed or disconnected from the receptacle by simply selecting the OFF position of the switch. Thus, the weatherproof cover protects the receptacle from damage "While-In-Use" and provides a disconnect switch to control power to the receptacle without having to open the receptacle cover.

8 Claims, 5 Drawing Sheets

WEATHERPROOF COVER AND DISCONNECT SWITCH

Under 35 USC 119(e), this application claims the benefit of the filing date of a provisional application having Ser. No. 60/623,733 which was filed on Oct. 29, 2004.

FIELD OF THE INVENTION

The present invention relates generally to weather proof coverings for electrical devices.

BACKGROUND OF THE INVENTION

Electrical receptacles provide a convenient means of supplying electrical power to electrical devices or appliances. In particular, outdoor lighting, yard equipment, recreation equipment, and the like make use of an electrical distribution system through access of these electrical receptacles located in the exterior walls of building structures such as homes and commercial buildings.

Specifically, in a typical electrical power installation, an electrical receptacle is connected to electrical conductors and then the receptacle is inserted into an electrical junction box. Exposure of electrical conductors to water and moisture deteriorates these conductors, therefore these electrical receptacles located in the exterior walls of the building structure must be protected from the elements of weather. Moreover, in certain regions where there is either extreme heat or extreme cold, damage to other components incorporated within the electrical receptacle may occur.

A first approach is to shield the electrical receptacle from the damaging effects of weather by using a weather-resistant outdoor electrical receptacle cover. Specifically, to prevent exposure of the electrical conductors to exterior elements, the receptacle cover is mounted over the receptacle. These weather-resistant covers are used in conjunction with electrical boxes or other housings to protectively enclose a variety of electrical devices. As a result, ready access to exterior electrical receptacles and protection from moisture and weather is available.

The usual weatherproof cover assembly also includes one or more doors or lids hinged to the cover plate to protect the electrical fixture mounted in the associated box from the weather when the fixture is not in use. In some cases, a single door protects an entire fixture; and, in other cases, each aperture of the electrical receptacle has its own cover such that one receptacle of an outlet can be in use while the other outlet receptacle is protected from the weather by an overlying cover.

The drawback of this approach is that when the receptacle is in use, the weather-resistant cover is open and, thereby, not effective in protecting the receptacle against damaging weather conditions. In practice, the receptacle is used by opening the weatherproof receptacle cover and inserting a plug into the receptacle. However, the weatherproof cover remains open while the receptacle is in use which may reduce the effectiveness of the cover in protecting the receptacle from the harsh environment. As such, most prior outdoor cover assemblies are at a disadvantage in that they provide protection against the weather only when the associated electrical fixtures are not in use—when the cover plate doors are closed. As soon as the cover doors are swung open to provide access to the associated electrical device, these fixtures are exposed to the elements and, thereby, become vulnerable to damage.

Accordingly, there is a series of weather-resistant cover assemblies which protect the associated electrical devices, usually electrical receptacles, from the weather when the fixtures are in use. These weather-resistant cover assemblies that provide protection while the electrical receptacle is in use are desirable since it is sometimes preferred to leave certain outdoor appliances plugged into an outdoor outlet for extended periods of time. Examples of such appliances include outdoor lighting such as spotlights. Even when an appliance is not intended to be left plugged in for an extended period of time, it is also sometimes preferred to provide weather resistant protection for the appliance plug during use. These known assemblies which can protect receptacles during use have hinged lids or doors which are deep enough to provide clearance for a plug or plugs plugged into the electrical receptacle being protected by the cover assembly. These assemblies also include openings for accommodating the electrical cords terminated by the plug or plugs, which openings are located at the bottoms of the assemblies so that the openings do not admit rainwater.

In cases, however, where there are opposing surfaces such as a pavement or a wall near the electrical receptacle, where, for example, rainwater can bounce off and enter the opening, the weatherproof cover will be rendered ineffective. In addition, if the electrical receptacle is a horizontally aligned electrical receptacle, the bottom opening for the appliance cord is no longer oriented downward creating a greater likelihood that water, moisture or other substances will enter the protected area. Accordingly, such covers would be unsuitable for protecting horizontally aligned electrical receptacles.

Moreover, in the aforementioned select case where it is preferred to leave certain outdoor appliances plugged into an outdoor outlet for extended periods of time, it may be desirable that the appliance plug be stabilized or locked in place. Particularly, when, for example, windy weather conditions are present, the wind may dislodge the appliance plug and, in turn, possibly damage the receptacle terminals by increasing contact distortion and, thereby, increasing the risk of loose contacts. In addition, some appliances may be damaged by a surge of current if the appliance plug is removed before the appliance has been properly prepared for powering down. Presently, there are no weatherproof covers available that provide the necessary features to secure the appliance plug in the electrical receptacle. Given these two scenarios, there is a need for a weatherproof cover having a locking mechanism to protect against unintentional removal of the plug from the electrical receptacle.

Furthermore, in the case where it is preferred to leave certain outdoor appliances plugged into an outdoor outlet for extended periods of time, it may be desirable to disable the power supplied to the appliance without removal of the appliance plug. Conventional weatherproof covers, however, provide consistent power at all times to an appliance in contact with the electrical receptacle. Thus, there is also a need for a weatherproof cover having a control unit that enables and disables the power provided to the electrical receptacle.

In summary, weatherproof covers designed to date are flawed in that they do not completely protect an electrical receptacle regardless of whether the electrical receptacle is in use or not. The conventional weatherproof cover only protects an electrical receptacle while the electrical receptacle is not in use. Other covers that provide protection while the electrical receptacle is in use leave enough space or a gap for a plug to be inserted into the electrical receptacle which enables the cover to shield both the plug and the electrical receptacle. Water, however, may seep underneath this particular type of cover as water bounces off opposing surfaces situated near the electrical receptacle, making these covers ineffective.

Thus, a need exists for a weatherproof cover for an electrical receptacle that is enabled to close completely when the receptacle is in use. Further, there is a need for a weatherproof cover that is enabled to stabilize or lock an appliance plug in position. Moreover, there is a need for a weatherproof cover that includes a power enabling and disabling feature that disables the power supplied to the appliance without removal of the appliance plug.

The present invention is directed to overcoming, or at least reducing the effects of one or more of the problems set forth above.

SUMMARY OF THE INVENTION

To address the above-discussed deficiencies of weatherproof covers for electrical receptacles, the present invention teaches a weatherproof cover that protects an electrical receptacle while it is being used. The weatherproof cover of the present invention includes a weatherproof switch that controls power to the receptacle. Specifically, the weatherproof cover in accordance with the present invention may include a plate having an opening for a receptacle and a switch disposed on the plate, wherein the switch is selectable between an ON position for connecting power to the receptacle and an OFF position for disconnecting power to the receptacle. A receptacle housing is disposed on the plate and is movable between an Open position allowing access to the receptacle and a Closed position covering the receptacle.

In operation, the receptacle is in use when receptacle cover is opened and a plug is inserted into the receptacle. The receptacle cover may be closed after the insertion of the plug and the weatherproof switch can be selected to the ON position to provide power to the receptacle. Power can be subsequently removed or disconnected from the receptacle by simply selecting the switch to the OFF position. Thus, the weatherproof cover protects the receptacle from damage "While-In-Use" and provides a disconnect switch to control power to the receptacle without having to open the receptacle cover. Furthermore, this first embodiment may include a locking mechanism for keeping the plug locked in the receptacle.

A second embodiment of the weatherproof cover for an electrical receptacle includes a combination of a separate receptacle housing portion with a separate disconnect switch portion. The housing portion includes a receptacle housing or cover capable of being removed between an Open position for exposing a receptacle, allowing a plug to be inserted into the receptacle, and a Closed position covering the receptacle. The disconnect switch portion includes a disconnect switch selectable between an ON position for connecting power to the receptacle and an OFF position for disconnecting power to the receptacle. In addition, this second embodiment may include a locking mechanism and a power indicator, such as an LED, which can be used to provide status information such as whether power is being delivered to the receptacle.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
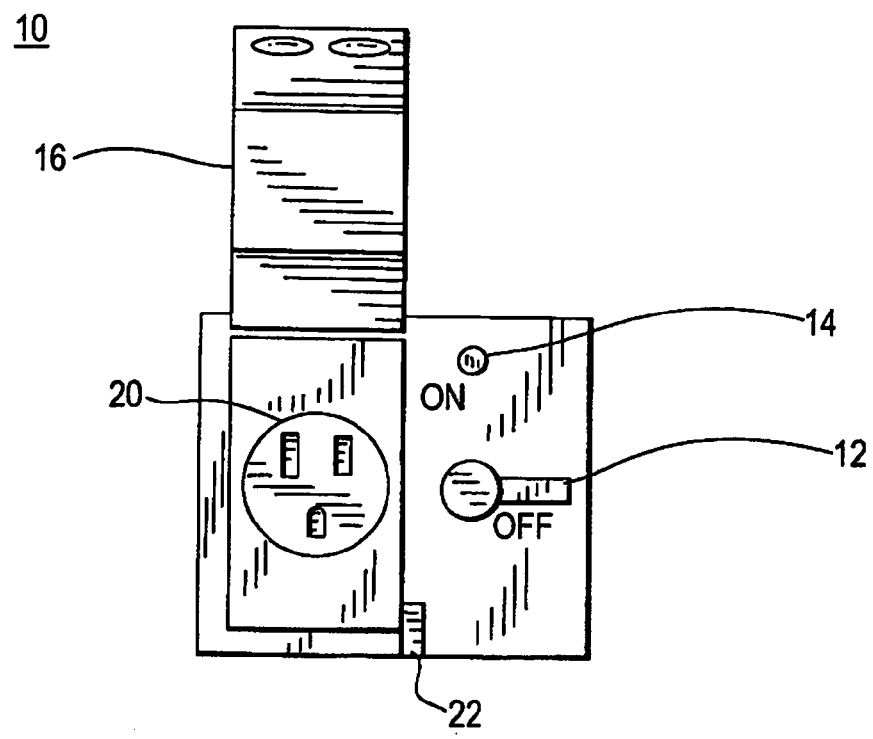
FIG. 1 is a front view of a weatherproof cover having a disconnect switch and a receptacle housing in an open position in accordance with a first embodiment of the invention.
Figure 2:
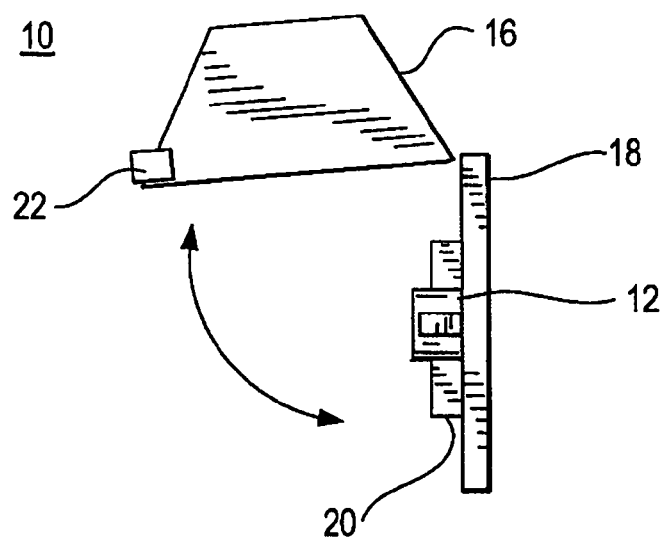
FIG. 2 is a partial side view of FIG. 1.
Figure 3:
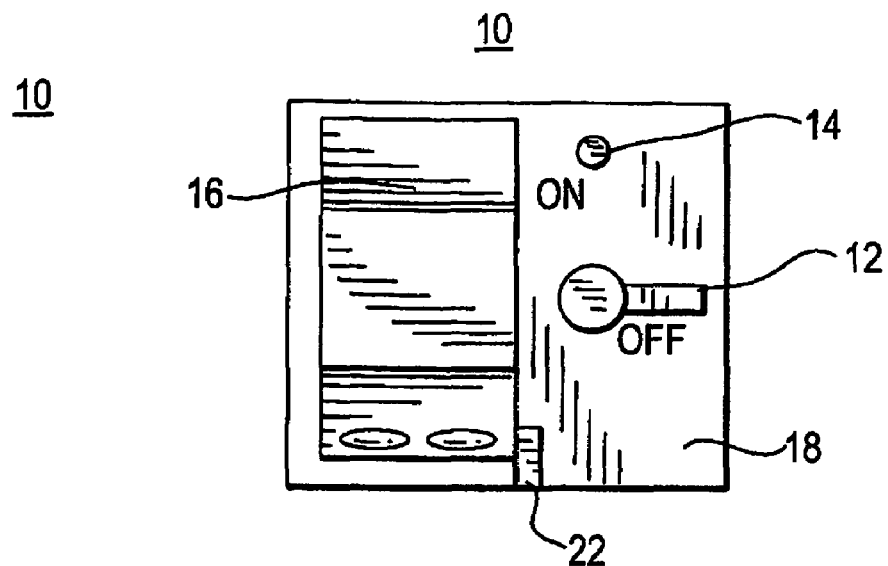
FIG. 3 is a front view of the weatherproof receptacle cover and disconnect switch of FIG. 1 showing the receptacle cover in a closed position.
Figure 4:
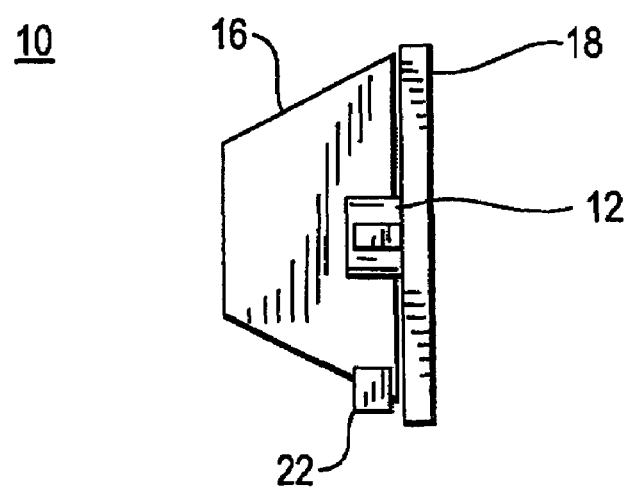
FIG. 4 is a partial side view of FIG. 3.

FIGS. 1 and 2, show a weatherproof cover 10 having a disconnect switch 12 and a receptacle housing 16 for covering a receptacle 20 in accordance with a first embodiment of the invention. The receptacle housing 16 is capable of being moved between an Open position, exposing the receptacle 20 to allow a plug to be inserted into the receptacle, shown in FIGS. 1 and 2, and a Closed position covering the receptacle, shown in FIGS. 3 and 4. The disconnect switch 12 is selectable between an ON position for connecting power to the receptacle 20 and an OFF position for disconnecting power to the receptacle. The receptacle housing 16 and the disconnect switch 12 are disposed on a plate 18. A power indicator 14, such as a light emitting diode (LED), can be used to provide status information such as whether power is being delivered to the receptacle 20. A lockout mechanism 22 is provided for locking the receptacle housing 16, when in the Closed position, to prevent unauthorized access to the receptacle.

The receptacle 20 is shown as a standard single three-prong electrical receptacle for handling 15 amp current applications. However, it should be understood that the receptacle can be a duplex receptacle having a standard receptacle as well as a ground fault circuit interrupter (GFCI) receptacle. The receptacle also can be selected to handle other current capacities such as 20 amp, 30 amp, and 50 amp and other capacities. Although the housing cover 16 is shown as a single gang housing (i.e., housing that can accommodate a single outlet), it should be understood that the housing can accommodate a dual gang configuration.

The weatherproof cover 10 can be made of any material capable of protecting a receptacle against damage from environmental elements such as rain sleet and snow. For example, the cover 10 can be made from cast metal thermoplastic or rugged, ultraviolet (UV) resistant poly carbonate material to provide weatherproof protection. The housing cover 16 can be attached to the plate using a hinge mechanism as well as being detachable. The weatherproof cover 10 can be used in residential, commercial and/or industrial applications. For example, the cover can be used in residential application such as in or nearby swimming pools, spas and other water exposed environments. The cover 10 is meant to be coupled to an electrical junction box (not shown) by mounting a fastening plate 18 of the cover 10 over the electrical junction box.

Figure 5:
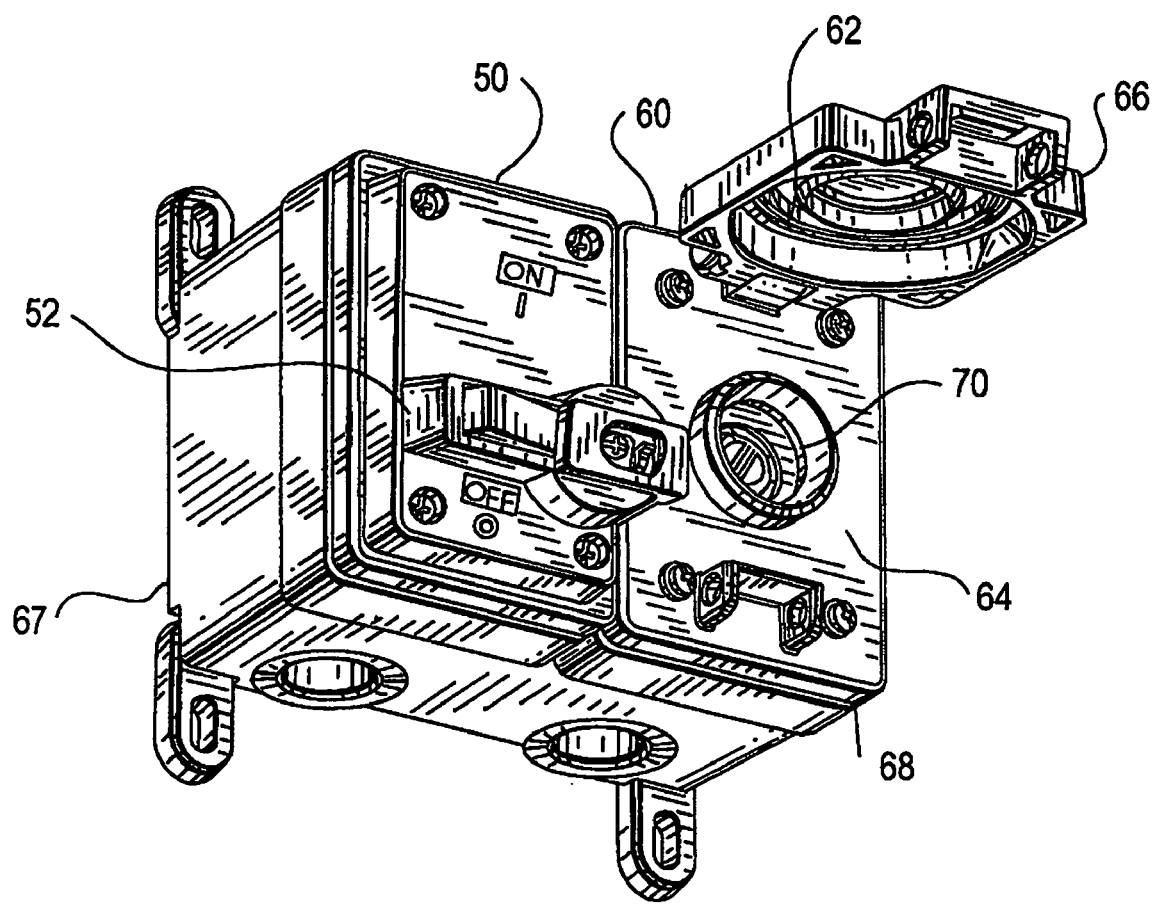
FIG. 5 is a perspective view of a weatherproof cover having a disconnect switch and a receptacle housing in an open position in accordance with a second embodiment of the invention.

FIG. 5 shows a weatherproof cover 40 having a receptacle housing portion 60 and a disconnect switch portion 50 in accordance with a second embodiment of the invention. The housing portion 60 includes a receptacle housing or cover 66 capable of being removed between an Open position for exposing a receptacle 70, allowing a plug (not shown) to be inserted into the receptacle 70, and a Closed position covering the receptacle shown in FIG. 7. The disconnect switch portion 50 includes a disconnect switch 52 selectable between an ON position for connecting power to the receptacle 70 and an OFF position for disconnecting power to the receptacle. The receptacle housing 60 and the disconnect switch portion 50 are shown disposed on a single dual-gang housing or plate 68, but it should be understood that other configurations are possible. The receptacle housing 60 is coupled to an electrical junction box 67 by mounting and fastening the plate 68 of the cover over the electrical junction box. Although not shown, a power indicator, such as an LED, can be used to provide status information such as whether power is being delivered to the receptacle 70. The weatherproof cover 40 can be used in residential, commercial and/or industrial applications.

The receptacle 70 is surrounded by a gasket 64 having a circular opening and the inside portion of the cover 66 is surrounded by a circular rib 62. When the housing cover 66 is moved to the Closed position (FIG. 7) to cover the receptacle 70, the gasket 64 receives the rib 62 so to form a weatherproof seal. In one embodiment, the gasket 64 and the rib 62 adhere to National Electrical Manufacturers Association (NEMA) configurations including 15 amp, 20 amp, 30 amp and other current capacity applications.

Figure 6:
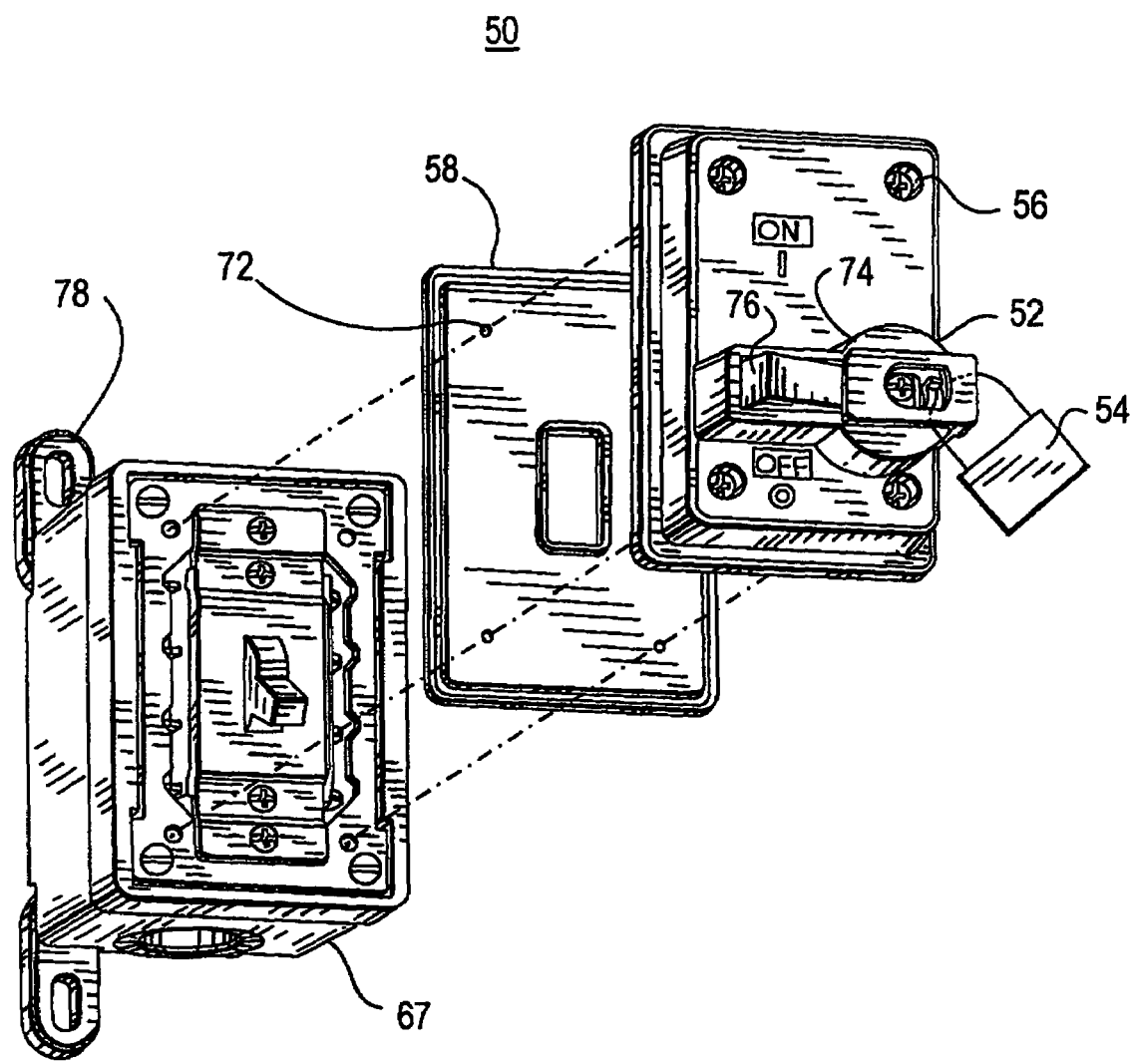
FIG. 6 is a detailed exploded view of the disconnect switch portion of FIG. 5.

FIG. 6 is a detailed exploded view of the disconnect switch portion 50 FIG. 5. A rubber gasket 58 is used to provide a seal between the disconnect portion 50 and the electrical junction box 67. The disconnect portion is mounted or attached to the box using screws 56 and/or other fastening methods. The rubber gasket 58 includes screw seals 72 to further improve the seal. In one embodiment, a rubber grommet can be placed underneath each screw to improve the seal. Mounting lugs 78 on the rear of the box can be fixed or movable (e.g. swivel) to provide flexible mounting capabilities. In one embodiment, the disconnect switch 52 is a toggle switch formed as a lever. A rubber bushing 74 inside the lever further improves the seal. The switch 52 includes a locking button 76 that secures the switch 52 when the switch is either in the ON position or the OFF position. A lockout mechanism 54 locks the switch 52 in the OFF position preventing unauthorized movement of the switch from the OFF position to the ON position.

Figure 7:
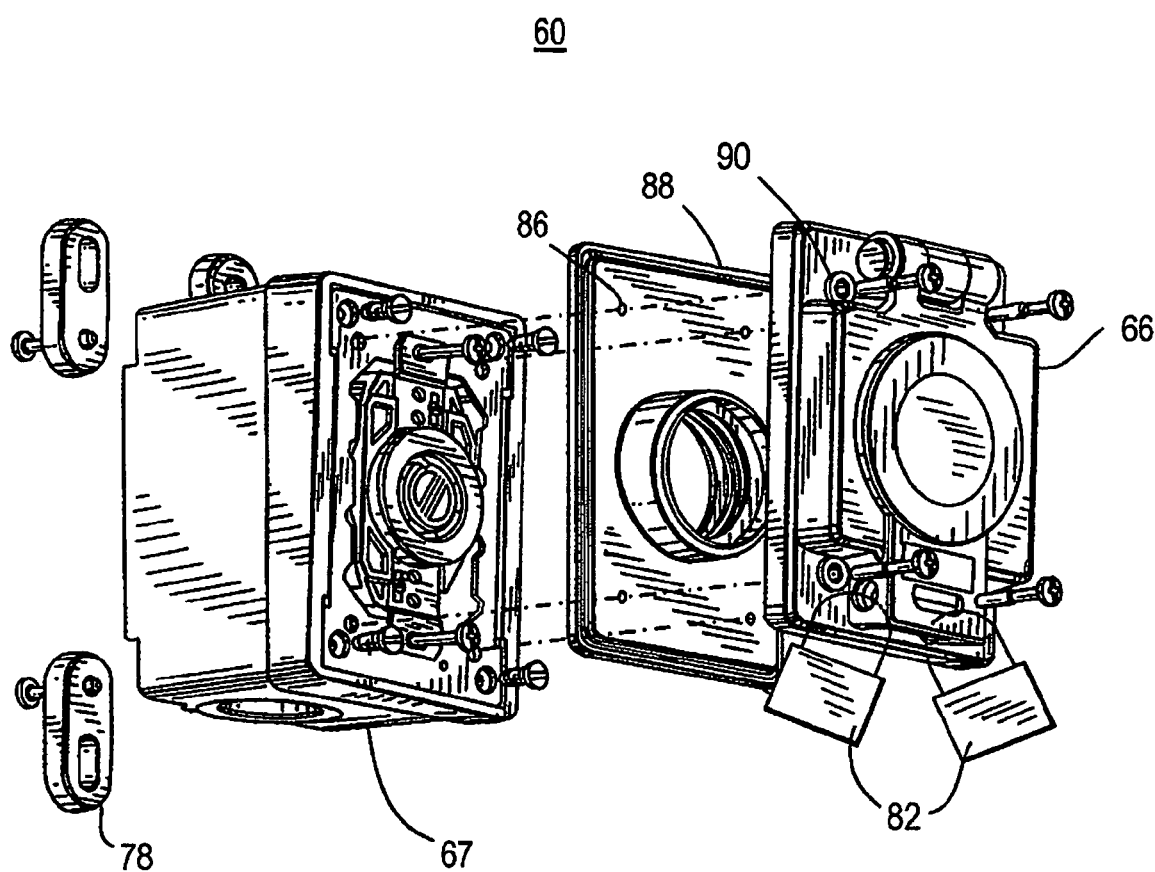
FIG. 7 is a detailed exploded view of the receptacle housing portion of FIG. 5.

FIG. 7 is a detailed exploded view of the receptacle housing portion 60 of FIG. 5. A rubber gasket 88 is used to provide a weatherproof seal between the housing portion 60 and the electrical junction box 67. The receptacle portion 60 is mounted or attached to the electrical junction box using screws 90 and/or other fastening methods. The rubber gasket 88 includes screw seals 86 to further improve the seal. In one embodiment, a rubber grommet can be placed underneath each screw to improve the seal. One or more lockout mechanisms 82 can be used to lock or secure the receptacle housing 66 in the closed position preventing unauthorized opening of the receptacle housing.

Those of skill in the art will recognize that the physical location of the elements illustrated in FIGS. 1 through 7 can be moved or relocated while retaining the function described above. For example, the shape of the receptacle housing portion 60 may change yet retain the function described above.

Advantages of this design include but are not limited to an electrical receptacle having a weatherproof cover wherein the design is one of high performance, simplicity, and cost efficiency.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. An electrical assembly comprising:
    an electrical junction box for receiving a receptacle and an on-off switch;
    a first cover plate having an opening for receiving the receptacle coupled to said electrical junction box with a gasket positioned there between to provide a weatherproof seal;
    a second cover plate for receiving the on-off switch coupled to said electrical junction box with a gasket positioned there between to provide a weatherproof seal;
    a cover pivotally coupled to the first cover plate to provide both weather protection and restricted access only to the receptacle by covering only the receptacle when in a closed position and to allow a plug to be inserted into and removed from the receptacle when in an open position and while the on off switch is in its on or off position; and
    said on-off switch is a weatherproof switch which is wired to the receptacle and can be operated by a user to control power to the receptacle when the cover over the receptacle is in an oven or closed position and a plug is either inserted in or removed from the receptacle.

2. The electrical, assembly of claim 1, further comprising:
    a power indicator to provide the status of the power supplied to the receptacle.

3. The electrical assembly of claim 1, wherein the first and second cover plates and pivotally coupled cover are made of cast iron, thermoplastic or ultraviolet resistant poly carbonate material.

4. The electrical assembly of claim 1, wherein the first cover plate comprises:
- a gasket juxtaposed to the opening for receiving the receptacle;
- wherein the cover pivotally coupled to the first cover plate has a rib such that when the cover moves to a closed position, the rib forms a weatherproof seal with The gasket juxtaposed to the opening.

5. The electrical assembly of claim 4, wherein the first cover plate further comprises:
- a lock-out mechanism coupled to the pivotally coupled cover to lock the cover in the closed position to prevent unauthorized movement of the cover from the closed position to the open position.

6. The electrical assembly of claim 4, wherein the gasket juxtaposed to the opening is rubber and includes rubber grommets for screw seals.

7. The electrical assembly of claim 4, further comprises:
- a locking button that secures the weatherproof switch when the switch is either in the ON position or the OFF position.

8. The electrical assembly of claim 4, further comprises:
- a lock-out mechanism coupled to the weatherproof switch to lock the weatherproof switch in the OFF position to prevent unauthorized movement of the switch from the OFF position to the ON position.

* * * * *

UNITED STATES PATENT AND TRADEMARK OFFICE
CERTIFICATE OF CORRECTION

PATENT NO. : 7,227,079 B2
APPLICATION NO. : 11/252605
DATED : June 5, 2007
INVENTOR(S) : Marc Noest, Cosmo Castaldo and Patricia Rocarro It is certified that error appears in the above-identified patent and that said Letters Patent is hereby corrected as shown below:

Title Page,

Item [73], Assignee: "Leviton Manufacturing Co., Ltd." Should read: --Leviton Manufacturing Co., Inc.--

Column 6 line 59, "oven" should read --open--.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,227,079 B2 |
| APPLICATION NO. | : 11/252605 |
| DATED | : June 5, 2007 |
| INVENTOR(S) | : Marc Noest, Cosmo Castaldo and Patricia Rocarro |

It is certified that error appears in the above-identified patent and that said Letters Patent is hereby corrected as shown below:

On Title Page,

Item [73], Assignee: "Leviton Manufacturing Co., Ltd." Should read: -- Leviton Manufacturing Co., Inc. --

Column 6 line 59, "oven" should read -- open --.

Signed and Sealed this

Twenty-ninth Day of July, 2008

JON W. DUDAS
*Director of the United States Patent and Trademark Office*